United States Patent
Gaal et al.

(10) Patent No.: US 9,537,555 B2
(45) Date of Patent: Jan. 3, 2017

(54) UPLINK TRANSMIT ANTENNA SELECTION IN CARRIER AGGREGATION

(75) Inventors: Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 815 days.

(21) Appl. No.: 13/401,791

(22) Filed: Feb. 21, 2012

(65) Prior Publication Data

US 2012/0213154 A1 Aug. 23, 2012

Related U.S. Application Data

(60) Provisional application No. 61/445,485, filed on Feb. 22, 2011.

(51) Int. Cl.
| | |
|---|---|
| H04W 4/00 | (2009.01) |
| H04B 7/06 | (2006.01) |
| H04W 72/04 | (2009.01) |
| H04L 5/00 | (2006.01) |
| H04L 27/00 | (2006.01) |

(52) U.S. Cl.
CPC ............ *H04B 7/0608* (2013.01); *H04B 7/061* (2013.01); *H04B 7/0691* (2013.01); *H04L 5/001* (2013.01); *H04L 5/0037* (2013.01); *H04L 5/0098* (2013.01); *H04L 2027/0044* (2013.01); *H04W 72/048* (2013.01)

(58) Field of Classification Search
USPC ............. 370/328–329; 375/135, 295; 455/68
See application file for complete search history.

(56) References Cited

U.S. PATENT DOCUMENTS

| | | | |
|---|---|---|---|
| 2010/0034314 A1* | 2/2010 | Brown et al. ................ | 375/295 |
| 2010/0197339 A1 | 8/2010 | Pedersen et al. | |
| 2010/0246561 A1 | 9/2010 | Shin et al. | |
| 2010/0279625 A1* | 11/2010 | Ko et al. ......................... | 455/68 |

(Continued)

FOREIGN PATENT DOCUMENTS

| | | |
|---|---|---|
| CN | 101808069 A | 8/2010 |
| JP | 201109174 A | 5/2011 |

(Continued)

OTHER PUBLICATIONS

Partial International Search Report—PCT/US2012/026161—ISA/EPO—May 9, 2012.

(Continued)

*Primary Examiner* — Vinncelas Louis
(74) *Attorney, Agent, or Firm* — Linda Gunderson

(57) ABSTRACT

An uplink antenna selection method where a base station transmits first and second control information to a user equipment. The first control information includes instructions for configuring the user equipment with closed-loop transmit antenna selection on one of a plurality of component carriers, and the second control information includes instructions for configuring the UE with open-loop transmit antenna selection on at least one other of the plurality of the component carriers. Also, the UE may transmit an indication of its capability for transmission antenna switching per component carrier. Further, the UE may perform steps to resolve inconsistent antenna selection triggers received from the base station.

16 Claims, 10 Drawing Sheets

(56) References Cited

U.S. PATENT DOCUMENTS

| | | | |
|---|---|---|---|
| 2011/0045863 A1 | 2/2011 | Lee et al. | |
| 2011/0081936 A1 | 4/2011 | Haim et al. | |
| 2011/0141928 A1 | 6/2011 | Shin et al. | |
| 2011/0149886 A1* | 6/2011 | Xu et al. | 370/329 |
| 2013/0100903 A1* | 4/2013 | Pajukoski et al. | 370/329 |
| 2013/0201932 A1* | 8/2013 | Ko et al. | 370/329 |
| 2014/0098837 A1* | 4/2014 | Mehta et al. | 375/135 |

FOREIGN PATENT DOCUMENTS

| | | |
|---|---|---|
| WO | WO-2011005575 A2 | 1/2011 |
| WO | WO-2011005576 A2 | 1/2011 |

OTHER PUBLICATIONS

Potevio: "Miscellaneous corrections to TS 36.300 on Carrier Aggregation", 3GPP Draft; R2-110976 Miscellaneous Corrections to TS 36.300 on Carrier Aggregation, 3rd Generation Partnership Project (3GPP), Mobile Competence Centre ; 650, Route Deslucioles ; F-06921 Sophia-Antipolis Cedex ; France, vol. RAN WG2, no. Taipei, Taiwan; 20110221, Feb. 12, 2011 (Feb. 12, 2011), XP050493310, [retrieved on Feb. 12, 2011].

Samsung: "Miscellaneous small clarifications and corrections", 3GPP Draft; 36661-CR0547-(REL-10) R2-110813 on Minor Clarifications, 3rd Generation Partnership Project (3GPP). Mobile Competence Centre ; 650, Route Deslucioles ; F-06921 Sophia-Antipolis Cedex ; France, vol. RAN WG2, no. Taipei, Taiwan; 20110221, Feb. 10, 2011 (Feb. 10, 2011), XP050493272, [retrieved on Feb. 10, 2011].

"3rd generation partnership project; technical specification group radio access network ;further advancements for E-UTRA ;LTE—Advanced feasibility studies in RAN WG4 (release 9)", 3GPP Standard ;3GPP TR 36.815 ,3rd Generation Partnership Project (3GPP), Mobile Competence Centre ;650,Route Des Lucioles ; F-06921 Sophia-Antipolis Cedex ;France,No. V9.1.0, Jun. 21, 2010 (Jun. 21, 2010),pp. 1-29, XP050441978.

CATT: Application of antenna selection for CAM, 3GPP Draft; R1-110963, 3rd Generation Partnership Project (3GPP) , Mobile Competence Centre ; 650, Route Des Lucioles ; F-06921 Sophia-ANTIPOL1SCEDEX ; France, vol. RAN WG1, no. Taipei, Taiwan; 20110221, Feb. 17, 2011 (Feb. 17, 2011), XP05049078.

Huawei : "Transmission mode configurati on and the mapping of PA/Antenna to CC", 3GPP Draft; R1-103109 Transmission Mode Configuration and the Mapping of Pantenna to CC, 3rd Generation Partnership Project (3GPP), Mobile Competence Centre ; 650, Route Des Lucioles ; F-06921 Sophia-Antipolis Cedex ; France, vol. RAN WG1, no. Montreal, Canada; 201000510, May 4, 2010 (May 4, 2010) , XP050420182.

International Search Report and Written Opinion—PCT/US2012/026161—ISA/EPO—Jul. 17, 2012.

Ipwireless, Nextwave, CMCC, Ericsson, Huawei, Nortel, ZTE, "UE transmit antenna selection[online]," 3GPP TSG-RAN WG2#64 R2-086995, Nov. 14, 2008.

NTT Docomo, "Initial Access Procedure for Asymmetric Wider Bandwidth in LTE-Advanced[online]," 3GPP TSGRAN WG1#57b R1-092802, Jul. 3, 2009.

Rapporteur (Samsung), "Introduction of Carrier Aggregation and UL/ DL MIMO[online]," 3GPP TSG-RAN WG2#72 R2-106856, 106856.zip>,Nov. 19, 2010.

Ipwireless, Nextwave, CMCC, Ericsson, Huawei, Nortel, ZTE, "UE transmit antenna selection[online]," 3GPP TSG-RAN WG2#64 R2-086995,<URL:http:>, Nov. 14, 2008.</URL:http:>.

NextWave Wireless, IP Wireless, UE transmit antenna selection—Signalling Aspects [online], 3GPP TSG-RAN WG1#55 R1-084433, Internet URL:http://www.3gpp.org/ftp/tsg_ran/WG1_RL1/TSGR1_55/Docs/R1-084433.zip Nov. 14, 2008.

NTT Docomo, "Initial Access Procedure for Asymmetric Wider Bandwidth in LTE-Advanced[online]," 3GPP TSGRAN WG1#57b R1-092802,<URL:http:> Jul. 3, 2009.</URL:http:>.

Qualcomm Incorporated, UL antenna switch in conjunction with CA[online], 3GPP TSG-RAN WG1#65 R1-111681, Internet URL:http://www.3gpp.org/ftp/tsg_ran/WG1_RL1/TSGR1_65/Docs/R1-111681.zip May 13, 2011.

Rapporteur (Samsung), "Introduction of Carrier Aggregation and UL/ DL MIMO[online]," 3GPP TSG-RAN WG2#72 R2-106856<URL:http:>, Nov. 19, 2010, 88 Pages.</URL:http:>.

Catt: "Transmission Scheme with Antenna Switching", 3GPP TSG-RAN WG1#63b R1-110051, Jan. 2011, 3 Pages, URL:http://www.3gpp.org/ftp/tsg_ran/WG1_RL1/TSGR1_63b/Docs/R1-110051.zip.

\* cited by examiner

UPLINK TRANSMIT ANTENNA SELECTION IN CARRIER AGGREGATION

CROSS-REFERENCE TO RELATED APPLICATION

This application claims the benefit of U.S. Provisional Patent Application Ser. No. 61/445,485 filed on Feb. 22, 2011, which is incorporated herein by reference in its entirety.

TECHNICAL FIELD

Aspects of the present disclosure relate generally to wireless communication systems, and more particularly, to uplink transmit antenna selection in carrier aggregation.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

LTE-Advanced may use spectrum in 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

In LTE Rel-8/9, uplink (UL) transmit antenna selection (TAS) is supported in which a UE uses one of a plurality of antennas at a given time. Also, LTE-Advanced Rel-10 supports UL multiple-input multiple-output (MIMO).

SUMMARY

Representative aspects of the present disclosure are directed to a wireless communication scheme that takes advantage of the UL TAS features supported by LTE Rel-8/9 and the MIMO features supported in LTE-Advanced Rel-10. According to one aspect, the scheme operates through a combination of open-loop and closed-loop configurations, where the UE selects one or more antenna ports for uplink transmissions based on 1) antenna select triggers or assignments received from a base station, and 2) one or more determinations made by the UE.

In one aspect of the present disclosure, UL TAS is performed where the UE assigns its antenna ports to one or more component carriers in response to various antenna selection assignments received from one or more base stations. The UE receives the various antenna selection assignments, identifies an inconsistency among the received assignments, and resolves the inconsistency to select an appropriate or optimal antenna port for one or more component carriers.

In another aspect of the present disclosure, assignment of UL TAS by an associated base station is enabled according to the capabilities of the UE. A UE transmits an indication of its capability for transmission antenna switching per component carrier in the UE's carrier aggregation. In response, a base station may transmit control information that includes a transmission antenna selection for the UE based at least in part on the indication of the UE capability.

In another aspect of the present disclosure, UL TAS may be enabled in different formats, depending on the configuration of component carriers comprising the UE's carrier aggregation. If the UE's component carriers comprising its carrier aggregation are continuous or adjacent to one another and a single power amplifier (PA) is utilized by the UE, then UL TAS may be configured in the same manner for all component carriers in the carrier aggregation. On the other hand, if the component carriers comprising the UE's carrier aggregation are non-continuous, i.e., separated from one another in frequency, and use different PAs for different component carriers, then UL TAS may be configured for component carriers in the carrier aggregation independently.

In another aspect of the present disclosure, a method of wireless communication includes transmitting, from a base station, first control information to a user equipment (UE) wherein the first control information includes instructions for configuring the UE with closed-loop transmit antenna selection on one of a plurality of component carriers. The method also includes transmitting, from the base station, second control information to the UE wherein the second control information includes instructions for configuring the UE with open-loop transmit antenna selection on at least one other of the plurality of the component carriers.

In another aspect of the present disclosure, an apparatus configured for wireless communication includes means for transmitting, from a base station, first control information to a user equipment (UE) wherein the first control information includes instructions for configuring the UE with closed-loop transmit antenna selection on one of a plurality of component carriers. The apparatus also includes means for transmitting, from the base station, second control information to the UE wherein the second control information includes instructions for configuring the UE with open-loop transmit antenna selection on at least one other of the plurality of the component carriers.

In another aspect of the present disclosure, a computer program product for wireless communication in a wireless network includes a non-transitory computer-readable medium having program code recorded thereon. The program code includes code to transmit, from a base station, first control information to a user equipment (UE) wherein the first control information includes instructions for configuring the UE with closed-loop transmit antenna selection on one of a plurality of component carriers. The program code also includes code to transmit, from the base station, second control information to the UE wherein the second control information includes instructions for configuring the UE with open-loop transmit antenna selection on at least one other of the plurality of the component carriers.

In another aspect of the present disclosure, an apparatus configured for wireless communication includes at least one processor and a memory coupled to the processor. The processor is configured to transmit, from a base station, first control information to a user equipment (UE) wherein the first control information includes instructions for configuring the UE with closed-loop transmit antenna selection on one of a plurality of component carriers. The processor is also configured to transmit, from the base station, second control information to the UE wherein the second control information includes instructions for configuring the UE with open-loop transmit antenna selection on at least one other of the plurality of the component carriers.

In another aspect of the present disclosure, a method of wireless communication includes receiving, at a user equipment (UE), first control information wherein the first control information includes instructions for configuring the UE with closed-loop transmit antenna selection on one of a plurality of component carriers. The method also includes receiving, at the UE, second control information wherein the second control information includes instructions for configuring the UE with open-loop transmit antenna selection on at least one other of the plurality of the component carriers.

In another aspect of the present disclosure, an apparatus configured for wireless communication includes means for receiving, at a user equipment (UE), first control information wherein the first control information includes instructions for configuring the UE with closed-loop transmit antenna selection on one of a plurality of component carriers. The apparatus also includes means for receiving, at the UE, second control information wherein the second control information includes instructions for configuring the UE with open-loop transmit antenna selection on at least one other of the plurality of the component carriers.

In another aspect of the present disclosure, a computer program product for wireless communication in a wireless network includes a non-transitory computer-readable medium having program code recorded thereon. The program code includes code to receive, at a user equipment (UE), first control information wherein the first control information includes instructions for configuring the UE with closed-loop transmit antenna selection on one of a plurality of component carriers. The program code also includes program code to receive, at the UE, second control information wherein the second control information includes instructions for configuring the UE with open-loop transmit antenna selection on at least one other of the plurality of the component carriers.

In another aspect of the present disclosure, an apparatus configured for wireless communication includes at least one processor and a memory coupled to the processor. The processor is configured to receive, at a user equipment (UE), first control information wherein the first control information includes instructions for configuring the UE with closed-loop transmit antenna selection on one of a plurality of component carriers. The processor is also configured to and receive, at the UE, second control information wherein the second control information includes instructions for configuring the UE with open-loop transmit antenna selection on at least one other of the plurality of the component carriers.

In another aspect of the present disclosure, a method of wireless communication includes generating, at a user equipment (UE) configured for carrier aggregation, an indication of the UE's capability for transmission antenna switching per component carrier in the carrier aggregation. The method also includes transmitting the indication to a base station.

In another aspect of the present disclosure, an apparatus configured for wireless communication includes means for generating, at a user equipment (UE) configured for carrier aggregation, an indication of the UE's capability for transmission antenna switching per component carrier in the carrier aggregation. The apparatus also includes means for transmitting the indication to a base station.

In another aspect of the present disclosure, a computer program product for wireless communication in a wireless network includes a non-transitory computer-readable medium having program code recorded thereon. The program code includes code to generate, at a user equipment (UE) configured for carrier aggregation, an indication of the UE's capability for transmission antenna switching per component carrier in the carrier aggregation. The program code includes code to transmit the indication to a base station.

In another aspect of the present disclosure, an apparatus configured for wireless communication includes at least one processor and a memory coupled to the at least one processor. The processor is configured to generate, at a user equipment (UE) configured for carrier aggregation, an indication of the UE's capability for transmission antenna switching per component carrier in the carrier aggregation. The processor is configured to transmit the indication to a base station.

In another aspect of the present disclosure, a method for wireless communication includes receiving, at a base station, an indication of a user equipment (UE) capability for antenna switching per component carrier in a carrier aggregation The method also includes determining, at the base station, a transmission antenna selection for the UE based, at least in part, on the indication of the UE capability.

In another aspect of the present disclosure, an apparatus configured for wireless communication includes means for receiving, at a base station, an indication of a user equipment (UE) capability for antenna switching per component carrier in a carrier aggregation. The apparatus also includes means for determining, at the base station, a transmission antenna selection for the UE based, at least in part, on the indication of the UE capability.

In another aspect of the present disclosure, a computer program product for wireless communication in a wireless network includes a non-transitory computer-readable medium having program code recorded thereon. The program code includes code to receive, at a base station, an indication of a user equipment (UE) capability for antenna switching per component carrier in a carrier aggregation. The program code also includes code to determine, at the base station, a transmission antenna selection for the UE based, at least in part, on the indication of the UE capability.

In another aspect of the present disclosure, an apparatus configured for wireless communication includes at least one processor and a memory coupled to the processor. The processor is configured to receive, at a base station, an indication of a user equipment (UE) capability for antenna switching per component carrier in a carrier aggregation. The processor is also configured to determine, at the base station, a transmission antenna selection for the UE based, at least in part, on the indication of the UE capability.

In another aspect of the present disclosure, a method of wireless communication includes receiving, at a user equipment (UE), a plurality of antenna selection assignments from at least one base station. The method also includes evaluating the received plurality of antenna selection assignments for an inconsistency. The method further includes, in respond to finding the inconsistency, determining, at the UE, antenna selection for uplink transmissions on at least one of a plurality of component carriers.

In another aspect of the present disclosure, an apparatus configured for wireless communication includes means for receiving, at a user equipment (UE), a plurality of antenna selection assignments from at least one base station. The apparatus also includes means for evaluating the received plurality of antenna selection assignments for an inconsistency. The apparatus further includes means for determining, at the UE, antenna selection for uplink transmissions on at least one of a plurality of component carriers in response to finding the inconsistency.

In another aspect of the present disclosure, a computer program product for wireless communication in a wireless network includes a non-transitory computer-readable medium having program code recorded thereon. The program code includes code to receive, at a user equipment (UE), a plurality of antenna selection assignments from at least one base station. The program code also includes code to evaluate the received plurality of antenna selection assignments for an inconsistency. The program code further includes code to, in response to finding the inconsistency, determine, at the UE, antenna selection for uplink transmissions on at least one of a plurality of component carriers.

In another aspect of the present disclosure, an apparatus configured for wireless communication includes at least one processor and a memory coupled to the at least one processor. The processor is configured to receive, at a user equipment (UE), a plurality of antenna selection assignments from at least one base station. The processor is also configured to evaluate the received plurality of antenna selection assignments for an inconsistency. The processor is further configured to, in response to finding the inconsistency, determine, at the UE, antenna selection for uplink transmissions on at least one of a plurality of component carriers.

Various other aspects and features of the disclosure are described in further detail below.

BRIEF DESCRIPTION OF THE DRAWINGS

FIG. 11 is a block diagram illustrating example blocks executed to implement one aspect of the present disclosure; and.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
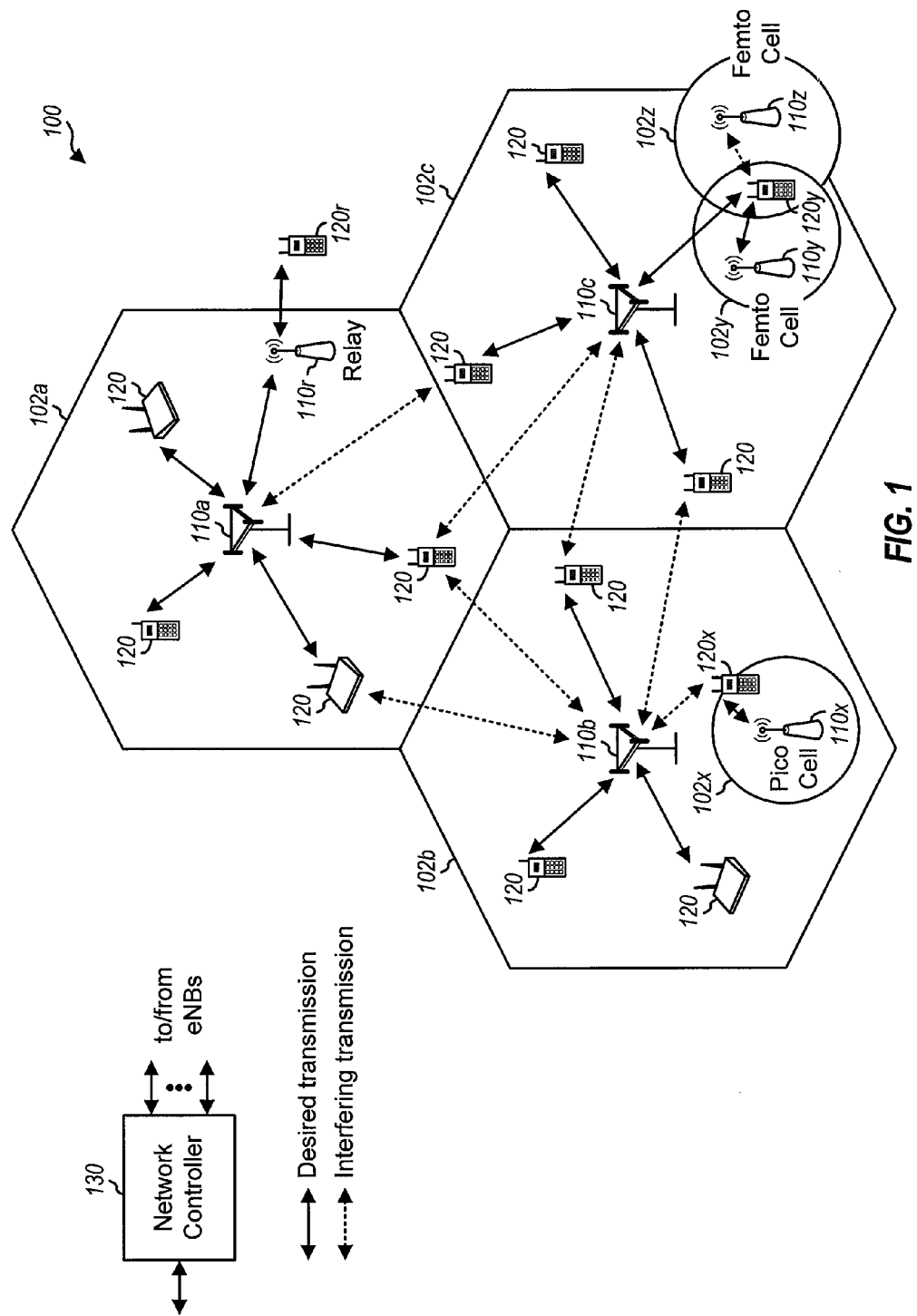
FIG. 1 is a block diagram illustrating an example of a telecommunications system.

FIG. 1 shows a wireless communication network 100, which may be an LTE network. The wireless network 100 may include a number of evolved Node Bs (eNBs) 110 and other network entities. An eNB may be a station that communicates with the UEs and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have aligned frame timing, where transmissions from different eNBs may be aligned in time. For asynchronous operation, the eNBs may have different frame timing, and transmissions from different eNBs may not be aligned in time. The techniques described herein may be used for both synchronous and asynchronous operation.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.4, 3, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.4, 3, 5, 10 or 20 MHz, respectively.

LTE-Advanced uses spectrum in 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

For the LTE-Advanced mobile systems, two types of carrier aggregation (CA) methods have been proposed, continuous CA and non-continuous CA. Non-continuous CA occurs when multiple available component carriers are separated along the frequency band. On the other hand, continuous CA occurs when multiple available component carriers are adjacent to each other. Continuous component carriers positioned within the same frequency band may be referred to as intra-band component carriers. However, when a UE's component carriers are spaced across more than one frequency band, e.g., where non-continuous component carriers in the UE's aggregation are within different bands, the component carriers may be referred to as inter-band component carriers. Both non-continuous and continuous CA aggregate multiple LTE/component carriers to serve a single unit of LTE Advanced UE.

Figure 2:
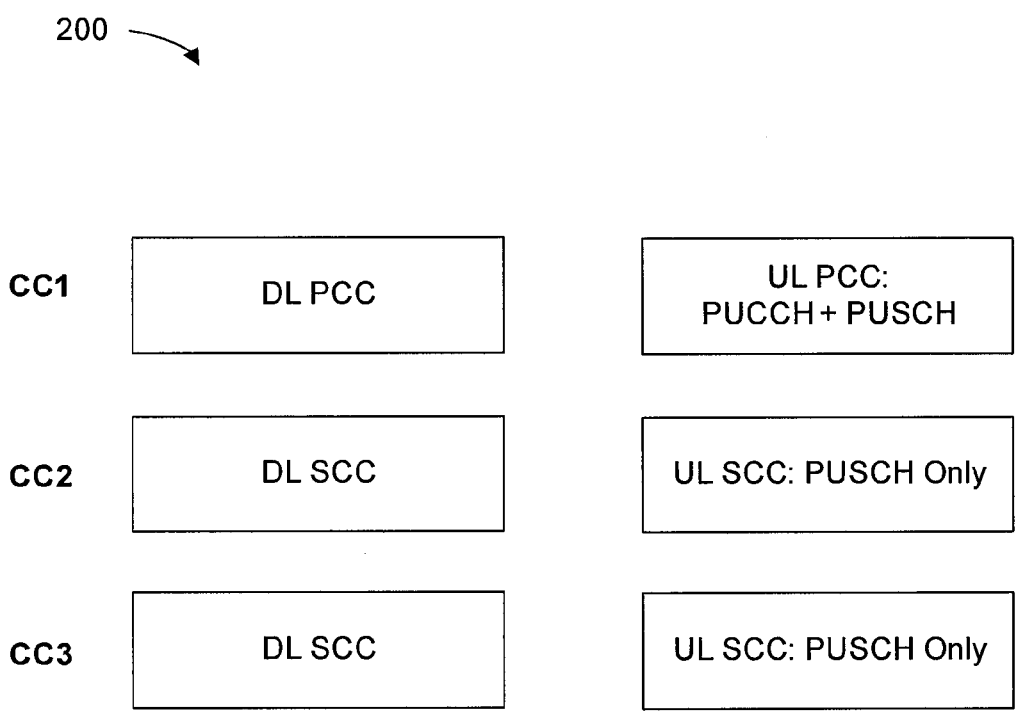
FIG. 2 is a block diagram illustrating a carrier aggregation (CA) configuration.

FIG. 2 shows a block diagram of a carrier aggregation (CA) system 200. The CA system 200 may include multiple component carriers (CCs). For example, in LTE-Advanced a UE may be configured with multiple CCs. One CC (e.g., CC1) may be designated as a primary component carrier (PCC) while the other CCs (e.g., CC2, CC3, etc.) may be designated as secondary component carriers (SCCs). The PCC may be semi-statically configured by higher layers on a per UE basis. In FIG. 2, the CA system 200 may include a downlink (DL) PCC and two DL SCCs. The CA system 200 may further include an uplink (UL) PCC and two UL SCCs. The UL PCC may carry PUCCH and PUSCH. The UL SCCs may carry only PUSCH. It is understood that the CA system 200 may have more than three CCs. When ACK/NACK, Channel Quality Indicator (CQI), and scheduling request (SR) signals are transmitted on PUCCH, they may be on the UL PCC. Accordingly, the UL SCC does not carry PUCCH for a given UE. There may be up to 5:1 DL to UL CC mapping. For example, one UL CC may need to support ACK/NACK transmission on PUCCH for up to 5 DL CCs.

Figure 3:
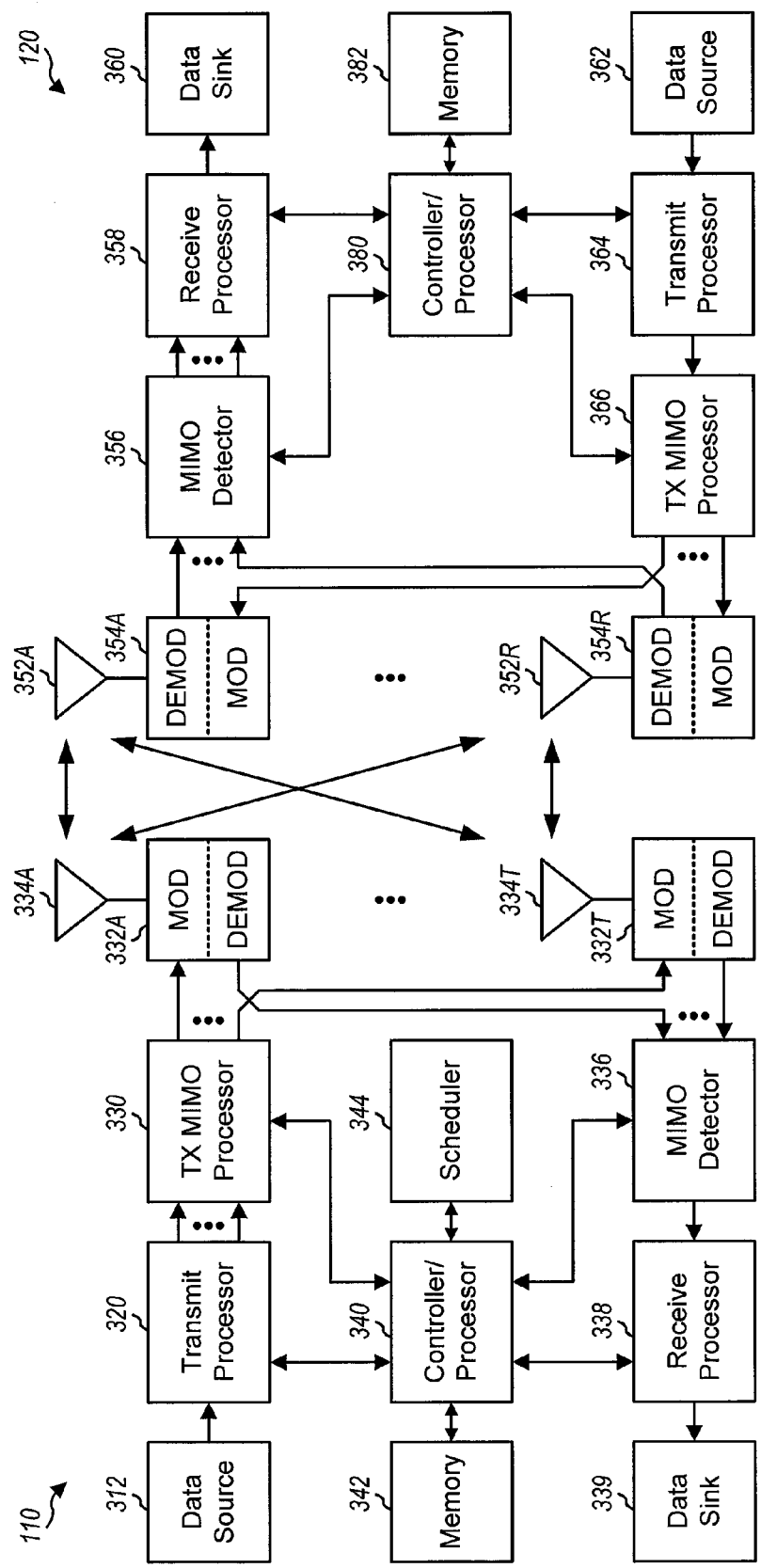
FIG. 3 is a block diagram illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 3352a through 3352r.

At the base station 110, a transmit processor 3320 may receive data from a data source 3312 and control information from a controller/processor 3340. The processor 3320 may process (e.g., encode and symbol map) the data and control information to obtain data symbols and control symbols, respectively. The processor 3320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 3354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 3358 may process (e.g., demodulate, deinterleave, and decode) the detected symbols, provide decoded data for the UE 120 to a data sink 3360, and provide decoded control information to a controller/processor 3380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 3366 if applicable, further processed by the demodulators 354a through 354r (e.g., for SC-FDM, etc.), and transmitted to the base station 110. At the base station 110, the uplink signals from the UE 120 may be received by the antennas 334, processed by the modulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Multiple RF receiving units and multiple fast Fourier transformers (FFTs) may be deployed with non-continuous CA in LTE-Advanced UE because the carriers are separated along the frequency band. As non-continuous CA supports data transmissions over multiple separated carriers across a large frequency range, propagation path loss, Doppler shift and other radio channel characteristics may vary significantly at different frequency bands.

In LTE and LTE-Advanced, sounding reference signal (SRS) transmission is supported. SRS may be designed as a wide-band sounding signal to facilitate uplink (UL) frequency-selective scheduling, as well as other purposes such as UL power control, time tracking, etc. In time division duplexing (TDD), SRS can also be used for downlink (DL) scheduling via exploitation of channel reciprocity. In general, SRS is targeted for the serving cell and linked to physical uplink shared channel (PUSCH) power control.

Each cell may have cell-specific SRS transmission instances (up to every UL subframe) and cell-specific SRS transmission bandwidth. Typically, it is expected that cell-specific SRS bandwidth covers most of the uplink system bandwidth, excluding the physical uplink control channel (PUCCH) region. Each UE in a given cell can be configured with UE-specific SRS transmission instances (within cell-specific SRS transmission instances) and UE-specific SRS transmission bandwidth, which can be as small as 4 resource blocks (RBs). Generally, SRS is transmitted in the last symbol of an uplink (UL) subframe, or one of the last two symbols in a special subframe in TDD systems.

In LTE Rel-8/9, periodic SRS is supported via RRC configuration. A UE may also be configured by RRC for a one-shot SRS transmission. In LTE Rel-10, aperiodic SRS (A-SRS) is supported. A-SRS may be a one-shot transmission. Further, support for multi-shot A-SRS may be possible. A-SRS may be triggered by a physical downlink control channel (PDCCH) in UL grants (e.g., DCI format 0/4) or some DL grants (e.g., DCI format 1A). Under CA, a UE may be configured for A-SRS transmissions in one CC or multiple CCs in the uplink.

In Rel-8/9, UL transmit antenna selection (TAS) is supported, in which a UE may select one of its multiple antennas at a given time. UL TAS may be configured by higher layers (e.g., via RRC configuration). If closed-loop UE TAS is enabled, the selected transmit antenna may be indicated via different scrambling of the PDCCH cyclic redundancy check (CRC). If open-loop UE TAS is enabled, the transmit antenna is to be selected by the UE and may not be specified in the standard. For SRS, if antenna selection is enabled for a UE supporting TAS, SRS can be transmitted from either antenna alternating in time.

According to the present disclosure, a wireless communication scheme is described that takes advantage of the UL TAS features supported by LTE Rel-8/9 and the MIMO features supported in LTE-Advanced Rel-10. Such a communication scheme enables steps performed by the base station and the UE to provide consistent UL TAS signaling under a range of conditions. As will be better appreciated from the discussion that follows, representative aspects of the present disclosure are directed to wireless communication schemes that enable consistent UL TAS signaling for a UE configured for MIMO communication.

According to some aspects of the present disclosure, the scheme operates through a combination of open-loop and closed-loop configurations, where the UE selects one or more antenna ports for uplink transmissions based on 1) antenna select triggers or assignments received from a base station, and 2) one or more determinations made by the UE. For one or more of the component carriers, the UE is configured for closed-loop TAS, where UL TAS for designated component carriers is controlled according to control information from an associated base station included in the PDCCH, such as, e.g., DCI information in UL grants. The designated carrier(s) may be, for example, a primary component carrier. On the remaining component carriers (e.g., secondary component carriers), the UE is configured with open-loop TAS. For component carriers where open-loop TAS is enabled, antenna ports are selected according to determinations made by the UE. The UE may follow various combinations of closed-loop and open-loop UL TAS on some or all the remaining carrier components, according to desired operating standards or configurations. For example, if the UE is capable of switching antennas independently, the UE may select another antenna when appropriate according to its determination. However, if the UE is not capable of such independent antenna switching, then the UE may follow the same antenna selection designated in the close-loop assignment. Utilizing a combination of open-loop and closed-loop UL TAS as described above reduces some UL signaling requirements at the UE.

According to another aspect, UL TAS is performed where the UE assigns its antenna ports to one or more component carriers in response to various antenna port triggers, which may be perceived at the UE as antenna selection assignments. Taken further, the UE receives the various antenna selection assignments, identifies at least one inconsistency among the received assignments, and resolves the inconsistencies to select an appropriate or optimal antenna port for one or more component carriers. A UE may perform various steps to ensure optimal antenna selection for uplink transmissions. In some cases, the UE may treat inconsistent antenna selection assignments received from the base station as an error event. The UE simply discards the inconstant assignments and performs antenna selection without regard to the inconsistent assignments. In other cases, the UE performs antenna selection according to a determined scheme or priority. The scheme or priority may be stored at the UE or may be received as instructions from the base station. By way of example, the UE may reserve certain antenna ports for certain component carriers and/or assign certain antennas to certain component carriers by treating the component carriers preferentially.

According to another aspect, assignment of UL TAS by an associated base station is enabled according to the capabilities of the UE. A UE transmits an indication of its capability for transmission antenna switching per component carrier in the UE's carrier aggregation. In response, a base station may transmit control information that includes a transmission antenna selection for the UE based at least in part on the indication of the UE capability.

According to other aspects, UL TAS may be enabled in different formats, depending on the configuration of component carriers comprising the UE's carrier aggregation. If the UE's component carriers comprising its carrier aggregation are continuous or adjacent to one another and a single power amplifier (PA) is utilized by the UE, then UL TAS may be configured in the same manner for all component carriers in the carrier aggregation. As such, if the UE switches an antenna utilized to transmit one component carrier, then the UE will also switch antennas for every other component carrier comprising the aggregation. On the other hand, if the component carriers comprising the UE's carrier aggregation are non-continuous, i.e., separated from one another in frequency, and use different PAs for different component carriers, then UL TAS may be configured for component carriers in the carrier aggregation independently. As such, the UE may switch an antenna utilized to transmit one or more component carriers without being required to do so for remaining carriers. As discussed above, continuous component carriers positioned within the same frequency band may be referred to as intra-band component carriers, while component carriers in the UE's aggregation within different bands may be referred to as inter-band component carriers.

Figure 4:
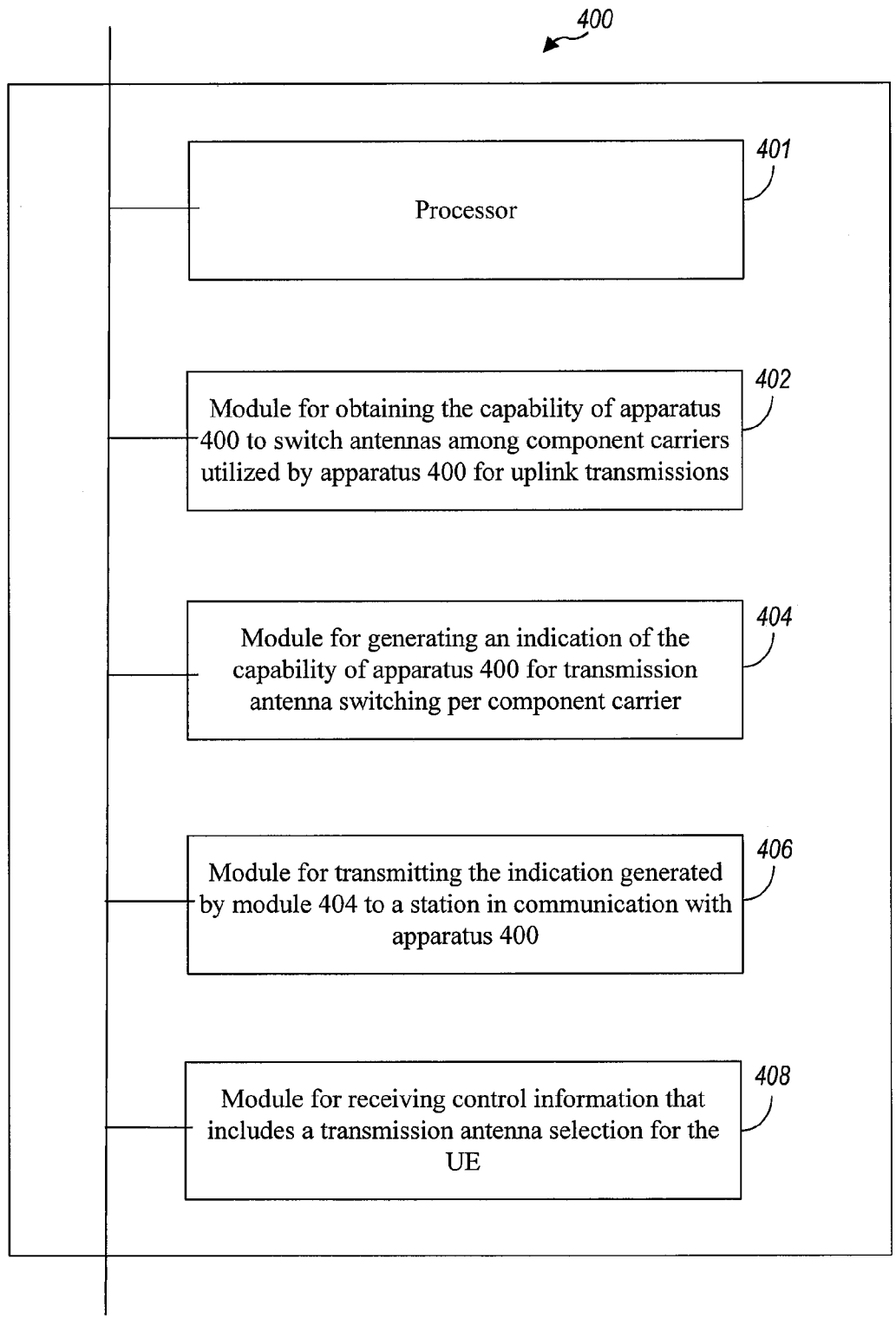
FIG. 4 is a block diagram illustrating an apparatus for wireless communication according to one aspect of the present disclosure.

FIG. 4 is a block diagram illustrating some aspects of an apparatus according to the present disclosure. Apparatus 400 for wireless communication (e.g., one or more components or portions of UE 120) is configured for carrier aggregation transmissions on multiple component carriers. Apparatus 400 includes modules 402, 404, 406, and 408 that cooperate to provide operations as described herein with respect to UEs. Each of modules 402, 404, 406, and 408 may comprise software, program code, or other logic (e.g., application specific integrated circuit (ASIC), field programmable gate array (FPGA), etc.), as may be operable upon or executed using a processor 401 to provide the functions described below.

Module 402 operates to obtain the capability of apparatus 400 to switch antennas among component carriers utilized by apparatus 400 for uplink transmissions. A UE's capability to switch antennas among component carriers may include the UE's ability to switch antennas for a subset or combination of component carriers at a given time rather than switching antennas for all component carriers simultaneously. The UE's capability may be further defined in terms of the type of component carriers utilized by the UE for uplink transmission. That is, according to some aspects, a UE may switch antennas for all component carriers where those component carriers are continuous. On the other hand, it may be preferred for a UE to switch antennas among only a portion or combination of component carriers where those component carriers are non-continuous.

The UE antenna switching capability described above may be predetermined and stored in the UE (e.g., in module 402) during the manufacture of apparatus 400, received as instructions from other network components, or based on other criteria. For example, the UE's capability may be based on various operational parameters, whereby information regarding the UE's capabilities with respect to these various operational parameters is stored in the UE at manufacture. By way of example, the UE's capability may be operationally-defined where, e.g., the UE supports operation on multiple bands and has separate antenna ports for operating bands or groups of operating bands. The UE may have two MIMO antenna ports for bands below 1 GHz and separately two other MIMO antenna ports for bands above 1 GHz. In the case where the UE utilizes non-continuous bands, the UE may switch only a subset of its available antennas among the available component carriers, and thus it is possible that the UE may switch antennas in a subset of the operating bands but not in the remainder of the operating bands. The determination regarding the UE's capability may thus be dependent on how its carrier components in a carrier aggregation are positioned with respect to one another. Further, information relating to the UE's capability may be received by apparatus 400 from other components within the wireless communication network (e.g., base station 110). The antenna switching capability information, in such aspects, may be received on a periodic or aperiodic basis.

Module 404 operates to generate an indication of the capability of apparatus 400 for transmission antenna switching per component carrier. The generated indication may comprise an indicator, such as an indicator bit, that corresponds to the UE's capability to switch antennas per component carrier. For example, an indicator bit corresponding to the UE's capability to switch antennas among a subset of component carriers may be set to 1 to indicate that feature is provided by the UE. On the other hand, that bit may be set to 0 to indicate the UE is not capable of that function.

Module 406 operates to transmit the indication generated by module 404 to a station in communication with apparatus 400 (e.g., base station 110). According to one aspect, module 406 causes apparatus 400 to transmit the indication on a periodic basis to ensure that communication between the UE and base station is maintained and optimized over time. Additionally or alternatively, module 406 may cause apparatus 400 to transmit the indication aperiodically, perhaps upon the occurrence of an event or condition, such as handover, loss of power, loss of signal, and the like. Providing such periodic and/or aperiodic transmission of the indicator helps ensure that communications between the apparatus (e.g., UE 120) and other station (e.g. base station 110) are optimized over changing conditions.

Module 408 operates to receive control information that includes transmission antenna selection for the UE. According to an aspect, the transmission antenna selection information received from the base station is based upon the indication of the UE's capability transmitted through operation of module 406. The received antenna selection may take on different forms where, e.g., the antenna selection may include instructions for independent antenna selection per component carrier. With the above in mind, such an instruction may be suitable where the UE transmits on component carriers that are separated among different frequency bands, i.e., according to an inter-band carrier aggregation configuration. On the other hand, the antenna selection may include instructions for simultaneous antenna switching for all aggregated component carriers. Such an instruction may be suitable where the UE transmits on component carriers within the same frequency band, i.e., according to an intra-band carrier aggregation configuration.

Figure 5:
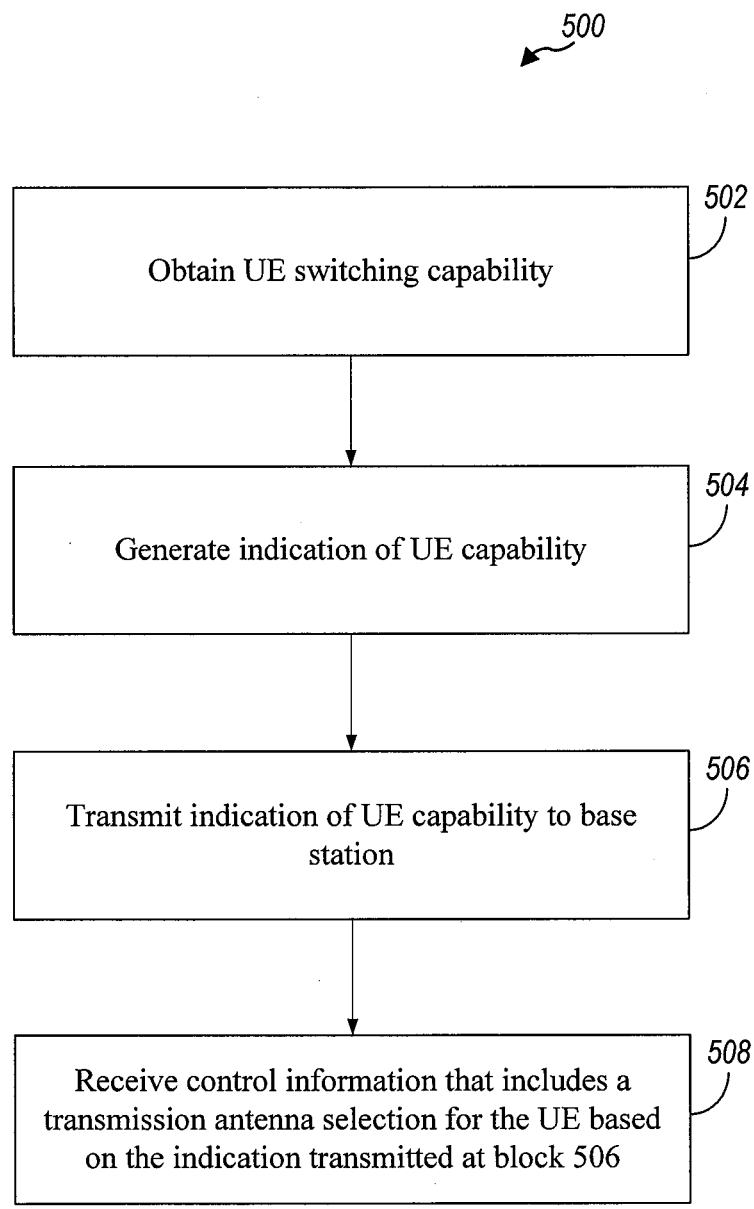
FIG. 5 is a functional block diagram illustrating example blocks executed to implement one aspect of the present disclosure.

FIG. 5 is a functional block diagram 500 illustrating example blocks executed, such as by operation of apparatus 400, to implement one aspect of the present disclosure. At block 502, the UE's antenna switching capability is obtained. As noted above, this capability information may be predetermined, in which case the UE may obtain the information from memory. In additional aspects, the UE may determine its antenna switching capabilities on an ad hoc basis. An indication of the UE's capability is generated at block 504. The indication of the UE's capability is then transmitted to the base station at block 506. At block 508, the UE receives control information that includes a transmission antenna selection for the UE based on the indication transmitted at block 506. For example, the UE may receive an antenna selection assignment contained within a downlink control information (DCI) message from the base station.

Figure 6:
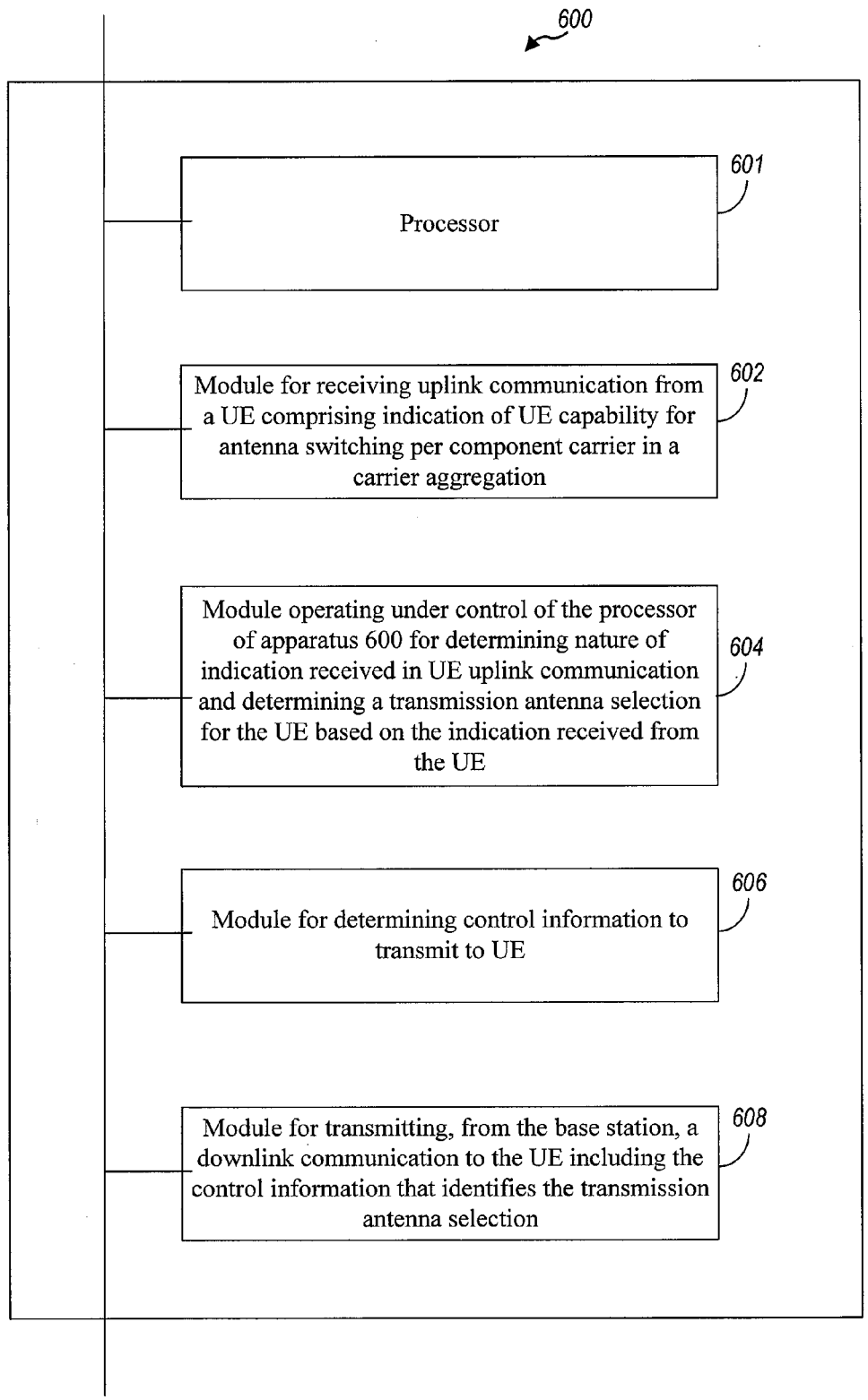
FIG. 6 is a block diagram representation of a wireless communication apparatus configured according to one aspect of the present disclosure.

FIG. 6 is a block diagram illustrating apparatus 600 for wireless communication. Apparatus 600 may include one or more components or portions of base station 110. Apparatus 600 also includes modules 602, 604, 606, and 608 that that are executed to provide operation as described herein with respect to base stations. Each of modules 602, 604, 606, and 608 may comprise software, program code, or other logic (e.g., ASIC, FPGA, etc.), as may be operable upon or executed by processor 601 to provide the functions described below.

Module 602 operates to receive an uplink communication from a UE comprising an indication of the UE's capability for antenna switching per component carrier in a carrier aggregation. For example, module 602 when executed by processor 601, controls the components of apparatus 600 including antennas, demodulators (not shown), and the like. Signals received from a base station are received and decoded through execution of module 602 to extract the indication of UE antenna switching capability.

Module 604 operates under control of processor 601 of apparatus 600 to determine the nature of the indication received in the UE's uplink communication. Module 604 may, for example, compare the indication received against a table of information stored in the memory of apparatus 600 that associates the indicated capability with a particular transmission antenna selection. Module 604 further operates to determine transmission antenna selection for the UE based on the indication received from the UE. For example, operation of module 604 would cause apparatus 600 to select a particular transmission antenna selection associated with the antenna switching capabilities identified for the UE through the received indication.

Module 606 operates to determine what control information to transmit to the UE. The control information may dictate transmission antenna selection for the UE. For example, the base station may transmit control information that includes instructions for independent antenna switching per component carrier in a carrier aggregation utilized by the UE. According to one aspect, such instructions may be transmitted where the UE transmits on component carriers that are spaced among different frequency bands, i.e., according to an inter-band carrier aggregation configuration. On the other hand, the base station may transmit control information that includes instructions for simultaneous antenna switching for all component carriers in a carrier aggregation utilized by the UE. According to another aspect, such instructions may be transmitted where the UE transmits on component carriers that are spaced within the same frequency band, i.e., according to an intra-band carrier aggregation configuration. The control information described above may be included in a DCI message.

Module 608 operates to transmit, from the base station, a downlink communication to the UE including the control information that identifies the transmission antenna selection. For example, the base station may transmit a DCI message which accommodates the UE's inability to switch antennas independently among different component carriers. Alternatively, the base station may transmit a DCI message which relies upon the UE's ability to switch antennas independently among different component carriers.

Figure 7:
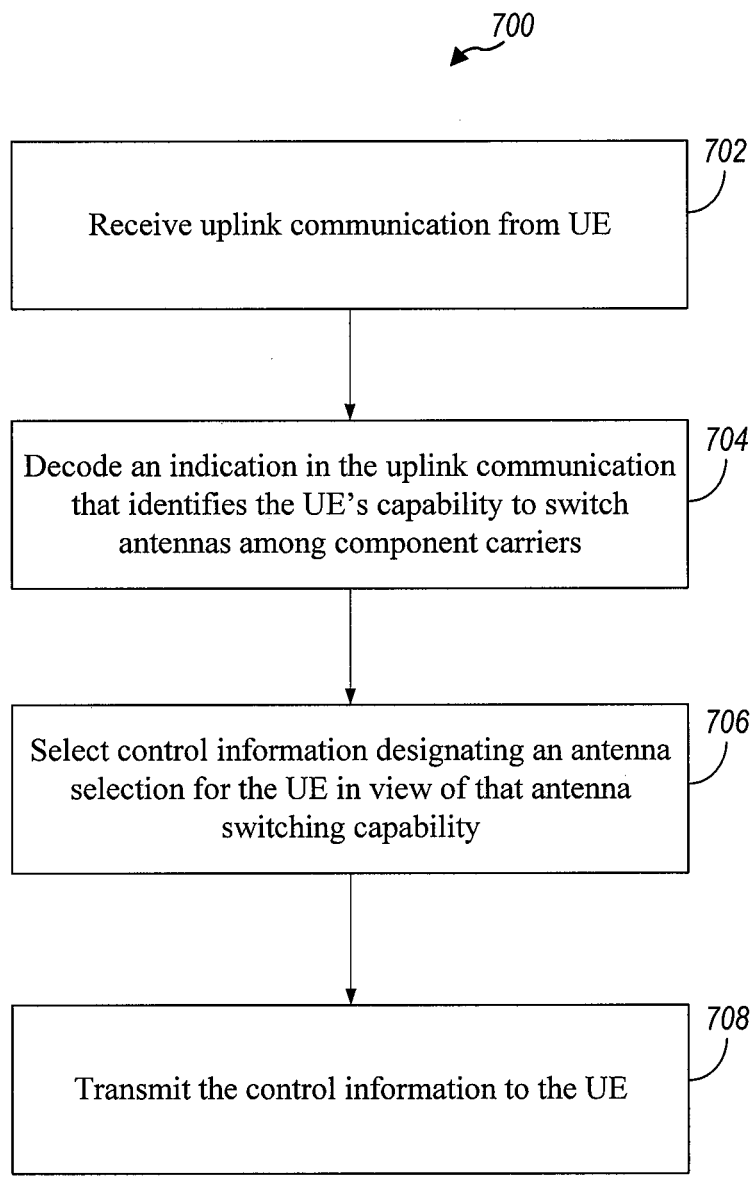
FIG. 7 is a functional block diagram illustrating example blocks executed to implement one aspect of the present disclosure.

FIG. 7 is a functional block diagram 700 illustrating example blocks executed to implement one aspect of the present disclosure. At block 702, an uplink communication is received from the UE. At block 704, the base station decodes an indication in the uplink communication that identifies the UE's capability to switch antennas among component carriers. As such, the base station determines what antenna switching capability the UE has through the received uplink communication. In response, at block 706, upon determining the UE's antenna switching capability, the base station selects control information designating an antenna selection for the UE in view of the reported antenna switching capability. For example, where the base station receives an indication that the UE is capable of switching antennas independently among carrier components in a carrier aggregation, the base station may transmit control information which optimizes the UE's capability. At block 708, the base station transmits the control information to the UE, thereby providing an antenna selection to the UE based on the UE's reported antenna switching capabilities.

Figure 8:
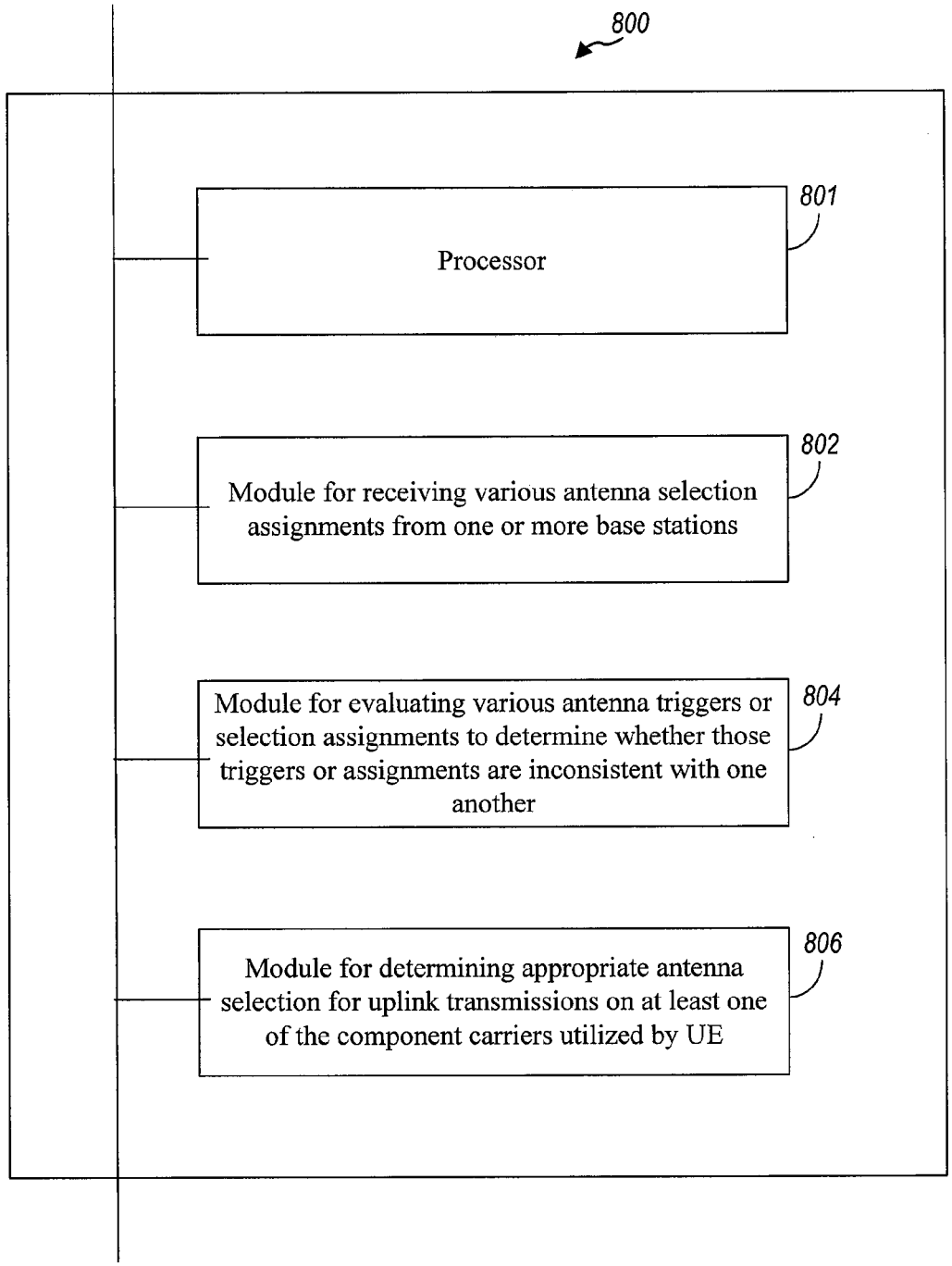
FIG. 8 is a block diagram representation of a wireless communication apparatus configured according to one aspect of the present disclosure.

FIG. 8 is a block diagram illustrating further aspects of an apparatus according to the present disclosure. Apparatus 800 for wireless communication (e.g., one or more components or portions of UE 120) is configured for carrier aggregation transmissions on multiple component carriers. Apparatus 800 includes modules 802, 804, 806, and 808 that cooperate to provide operations as described herein with respect to UEs. Each of modules 802, 804, 806, and 808 may comprise software, program code, or other logic (e.g., application specific integrated circuit (ASIC), field programmable gate array (FPGA), etc.), as may be operable upon or executed using processor 801 to provide the functions described below.

Module 802 operates to receive various antenna selection assignments from one or more base stations (e.g., such as one or more of base stations 110). The antenna selection assignments signal or trigger the UE to select particular antenna ports to use for transmitting over one or more component carriers in a UE's carrier aggregation.

Module 804 operates to evaluate the various antenna triggers or selection assignments to determine whether those triggers or assignments are inconsistent with one another. In this case, an inconsistency may occur when 1) one or more selection assignments indicate use of one antenna port on one or more component carriers in the carrier aggregation while other selection assignments indicate use of other antenna ports for the same component carriers, and/or 2) one selection assignment indicates use of an antenna for component carriers that cannot be accommodated by the given antenna port at a given time. That is, the antenna selection assignments may call for the assignment of the same antenna port for divergent or otherwise incompatible component carriers in the carrier aggregation such that the assignment cannot be accommodated by the UE. In that case, the antenna selection assignments can be categorized as inconsistent.

Module 806 operates to determine an appropriate antenna selection for uplink transmissions on at least one of the component carriers utilized by the UE. This determination may be made in response to the inconsistency determination made by module 804. Where there are no inconsistent assignments, the UE simply selects the assigned antenna port.

According to an aspect, an antenna selection may be performed among inconsistent assignments by simply ignoring inconsistent antenna selection assignments. In that case, the inconsistent selection assignments may be treated as an error event and discarded. The UE ignores the discarded error event and proceeds to make an antenna selection without regard to the discarded assignments. Where, for example, the antenna selection assignments are included in the PDCCH, the UE discards the received PDCCH.

According to another aspect, the UE may identify an antenna port as appropriate or optimal by identifying a majority of triggers or assignments among the received assignments. In that case, the antenna port indicated in the majority of UL TAS triggers is selected. For example, there may be three TAS assignments with two TAS assignments indicating selection of transmit antenna 1 and one TAS assignments indicating selection transmit antenna 2. In this scenario, the UE would use antenna 1 for the UL transmissions because it had more TAS assignments.

Further, the UE may select an antenna port for one or more component carriers according to a determined priority. The UE may be configured to prioritize certain component carriers where, for example, primary component carriers may be given priority or treated preferentially such that they are assigned first or assigned to an antenna port that is determined to be optimal (e.g., operating with high SINR or the like). After the primary component carrier is assigned, secondary component carriers may be assigned according to further prioritization and/or according to a predetermined scheme. Also, certain antenna ports may be reserved for assignment only to component carriers assigned a higher priority (again, e.g., a primary component carrier).

According to yet another aspect, the UE may resolve antenna selection assignments received from the base station to achieve certain criteria. For example, the UE may follow rules to achieve a pattern dictated by the lowest repetition rate SRS. That is, there is an implicit sequence or pattern for SRS transmissions. For example, SRS1 may have a periodicity of 10 ms and may be transmitted on a first component carrier. SRS2 may have a periodicity of 20 ms and may be transmitted on a second component carrier. The UE may follow the antenna pattern dictated by SRS2 which is 1, 2, 1, 2 . . . with a periodicity of 20 ms, where '1' represents antenna 1, and '2' represents antenna 2 of the UE. As such, the antenna pattern for SRS1 is 1, 2, 2, 1, 1, 2, 2, 1 . . . with a periodicity of 10 ms (instead of 1, 2, 1, 2, 1, 2, 1, 2 . . . ). Thus, the same antenna is used when SRS1 and SRS2 are transmitted at the same time on the first component carrier and the second component carrier, respectively.

Also, in another aspect of the present disclosure, the UE may proceed according to fixed rules, where certain antenna ports are always utilized first for particular component carriers (e.g. always use port 0). By way of further example, in the context of periodic SRS, if the same antenna port is required, configuration of periodic SRS of all component carriers should be consistent, such that these simultaneous SRS transmissions use the same port in the corresponding subframes.

Figure 9:
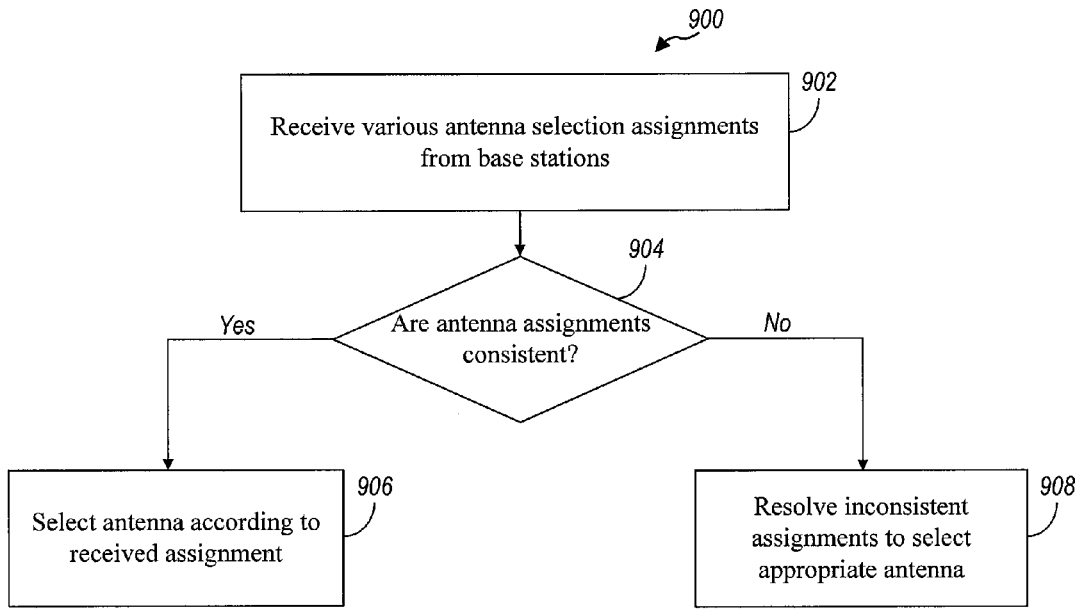
FIG. 9 is a functional block diagram illustrating example blocks executed to implement one aspect of the present disclosure.

FIG. 9 is a functional block diagram 900 illustrating example blocks executed to implement one aspect of the present disclosure. At block 902, various antenna selection assignments from one or more base stations are received. At block 904, the various antenna selection assignments are evaluated to determine whether they are inconsistent with one another. For example, an inconsistent selection assignment may arise when one assignment indicates use of one antenna port on one or more component carriers while another selection assignment indicates use of other antenna ports for the same component carriers, and/or when one selection assignment indicates use of an antenna for component carriers that cannot be accommodated by the given antenna port at a given time. An appropriate antenna selection for uplink transmissions on at least one of the component carriers utilized by the UE is determined at block 906.

Figure 10:
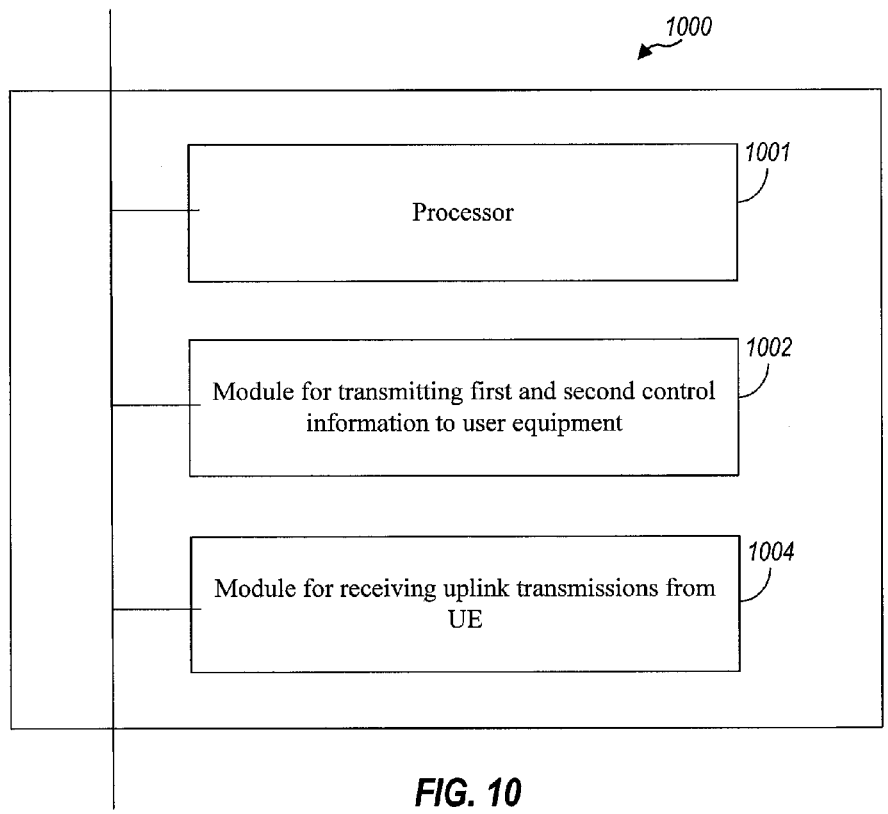
FIG. 10 is a block diagram representation of a wireless communication apparatus configured according to one aspect of the present disclosure.

FIG. 10 is a block diagram illustrating apparatus 1000 for wireless communication. Apparatus 1000 may include one or more components or portions of base station 110. Apparatus 1000 also includes modules 1002, 1004, 1006, and 1008 that that are executed to provide operation as described herein with respect to base stations. Each of modules 1002, 1004, 1006, and 1008 may comprise software, program code, or other logic (e.g., ASIC, FPGA, etc.), as may be operable upon or executed by processor 1001 to provide the functions described below.

Module 1002 operates to transmit first and second control information to a UE. The first control information includes instructions for configuring the user equipment with closed-loop transmit antenna selection on one of a plurality of component carriers, and the second control information includes instructions for configuring the UE with open-loop transmit antenna selection on at least one other of the plurality of the component carriers. Module 1004 operates to receive uplink transmissions from a UE such as, for example, an indication of the UE's capability for transmission antenna switching per component carrier.

Figure 11:
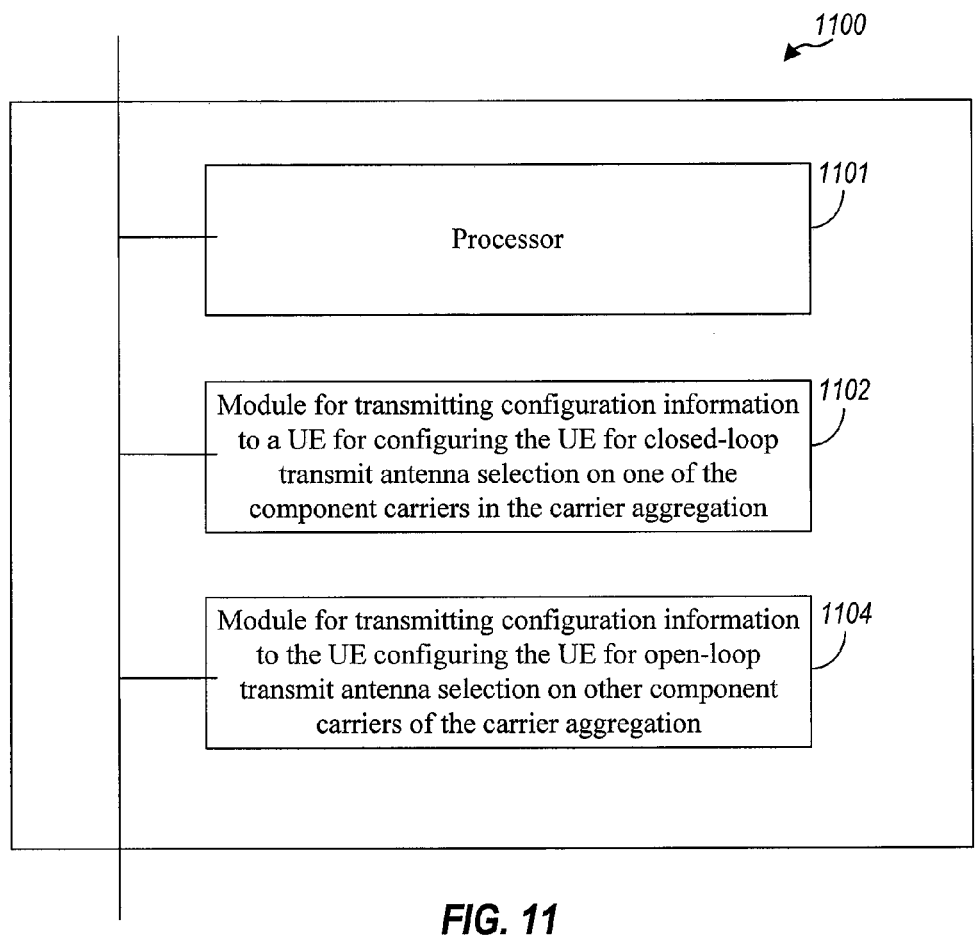

FIG. 11 is a functional block diagram 1100 illustrating example blocks executed to implement one aspect of the present disclosure. The various blocks of functional block diagram 1100 may be performed by a base station.

Module 1102 operates to transmit configuration information to a UE for configuring the UE for closed-loop transmit antenna selection on one of the component carriers in the carrier aggregation. According to one aspect, this is achieved by transmitting first control information to the UE wherein the first control information includes instructions for configuring the user equipment with closed-loop transmit antenna selection on one of a plurality of component carriers.

Module 1104 operates to transmit configuration information to the UE configuring the UE for open-loop transmit antenna selection on other component carriers of the carrier aggregation. According to another aspect, this is achieved by transmitting second control information to the UE wherein the second control information includes instructions for configuring the UE with open-loop transmit antenna selection on at least one other of the component carriers.

Figure 12:
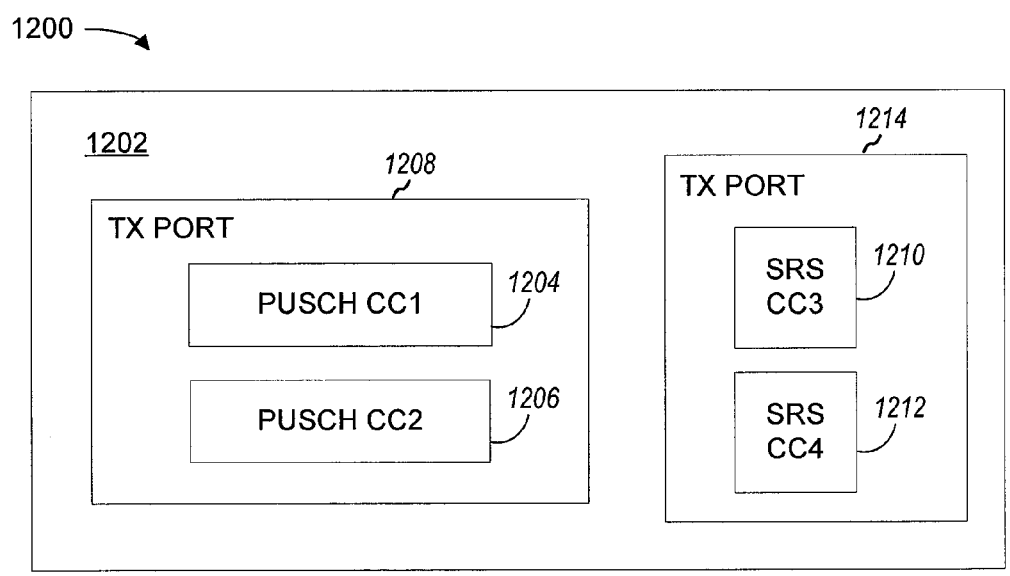
FIG. 12 is a block diagram illustrating a single power amplifier design for a UE according to one aspect of the present disclosure.

When a single power amplifier (PA) is used for two or more component carriers, and TAS is enabled, using the same antenna port for all component carriers at a given time may generally be preferred. FIG. 12 illustrates a block diagram 1200 of a single PA 1202 utilized for two component carriers (CC1 and CC2) in a UE that has TAS also enabled. As mentioned above, if the UE's component carriers comprising its carrier aggregation are continuous or adjacent to one another and a single PA is used by the UE for all of its component carriers, then UL TAS may be configured in the same manner for all component carriers in the carrier aggregation. Accordingly, in utilizing single PA 1202, if PUSCH 1204 and 1206 are to be transmitted on two or more component carriers in an intra-band carrier aggregation, their transmission should be made using the same antenna port, e.g., TX port 1208. Additionally, if SRS are to be transmitted simultaneously on two or more component carriers in an intra-band carrier aggregation, e.g., SRS CC3 1210 and SRS CC4 1212, their transmission should also be made using the same antenna port, e.g., TX port 1214 of PA 1202.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
   receiving, by a base station, from a user equipment (UE), an indication of antenna switching capabilities of the UE for a plurality of component carriers, wherein the indication of antenna switching capabilities of the UE indicates whether the UE is capable of switching at least one antenna utilized to transmit on one or more components carriers of the plurality of component carriers without being required to switch an antenna for remaining component carriers of the plurality of the component carriers, wherein whether the UE is capable is determined based at least in part on whether the UE supports an inter-band carrier aggregation configuration;
   determining, by the base station, a transmission antenna selection associated with the antenna switching capabilities based on the received indication;
   transmitting, from the base station, first control information to the UE, wherein the first control information includes instructions for configuring the UE with closed-loop transmit antenna selection on one of the plurality of component carriers based on the transmission antenna selection; and
   transmitting, from the base station, second control information to the UE wherein the second control information includes instructions for configuring the UE with open-loop transmit antenna selection on at least one other of the plurality of the component carriers based on the transmission antenna selection.

2. The method of claim 1, wherein the one of the plurality of component carriers includes a primary component carrier.

3. The method of claim 2, wherein the at least one other of the plurality of component carriers includes a secondary component carrier.

4. An apparatus configured for wireless communication, comprising:
   means for receiving, by a base station, from a user equipment (UE), an indication of antenna switching capabilities of the UE for a plurality of component carriers, wherein the indication of antenna switching capabilities of the UE indicates whether the UE is capable of switching at least one antenna utilized to transmit on one or more components carriers of the plurality of component carriers without being required to switch an antenna for remaining component carriers of the plurality of the component carriers, wherein whether the UE is capable is determined based at least in part on whether the UE supports an inter-band carrier aggregation configuration;
   means for determining, by the base station, a transmission antenna selection associated with the antenna switching capabilities based on the received indication;
   means for transmitting, from the base station, first control information to the UE, wherein the first control information includes instructions for configuring the UE with closed-loop transmit antenna selection on one of the plurality of component carriers based on the transmission antenna selection; and
   means for transmitting, from the base station, second control information to the UE wherein the second control information includes instructions for configuring the UE with open-loop transmit antenna selection on at least one other of the plurality of the component carriers based on the transmission antenna selection.

5. The apparatus of claim 4, wherein the one of the plurality of component carriers includes a primary component carrier.

6. The apparatus of claim 5, wherein the at least one other of the plurality of component carriers includes a secondary component carrier.

7. A non-transitory computer-readable medium having program code recorded thereon comprising:
   program code to receive, by a base station, from a user equipment (UE), an indication of antenna switching capabilities of the UE for a plurality of component carriers, wherein the indication of antenna switching capabilities of the UE indicates whether the UE is capable of switching at least one antenna utilized to transmit on one or more components carriers of the plurality of component carriers without being required to switch an antenna for remaining component carriers of the plurality of the component carriers, wherein whether the UE is capable is determined based at least in part on whether the UE supports an inter-band carrier aggregation configuration;
   program code to determine, by the base station, a transmission antenna selection associated with the antenna switching capabilities based on the received indication;
   program code to transmit, from the base station, first control information to the UE, wherein the first control information includes instructions for configuring the UE with closed-loop transmit antenna selection on one of the plurality of component carriers based on the transmission antenna selection; and
   program code to transmit, from the base station, second control information to the UE wherein the second control information includes instructions for configuring the UE with open-loop transmit antenna selection on at least one other of the plurality of the component carriers based on the transmission antenna selection.

8. An apparatus configured for wireless communication, the apparatus comprising:
   at least one processor; and
   a memory coupled to the at least one processor, wherein the at least one processor is configured to:
   receive, by a base station, from a user equipment (UE), an indication of antenna switching capabilities of the UE for a plurality of component carriers, wherein the indication of antenna switching capabilities of the UE indicates whether the UE is capable of switching at least one antenna utilized to transmit on one or more components carriers of the plurality of component carriers without being required to switch an antenna for remaining component carriers of the plurality of the component carriers, wherein whether the UE is capable is determined based at least in part on whether the UE supports an inter-band carrier aggregation configuration;

determine, by the base station, a transmission antenna selection associated with the antenna switching capabilities based on the received indication;

transmit, from the base station, first control information to the UE, wherein the first control information includes instructions for configuring the UE with closed-loop transmit antenna selection on one of the plurality of component carriers based on the transmission antenna selection; and transmit, from the base station, second control information to the UE wherein the second control information includes instructions for configuring the UE with open-loop transmit antenna selection on at least one other of the plurality of the component carriers based on the transmission antenna selection.

9. A method of wireless communication, comprising:

sending, by a user equipment (UE), to a base station, an indication of antenna switching capabilities of the UE for a plurality of component carriers, wherein the indication of antenna switching capabilities of the UE indicates whether the UE is capable of switching at least one antenna utilized to transmit on one or more components carriers of the plurality of component carriers without being required to switch an antenna for remaining component carriers of the plurality of the component carriers, wherein whether the UE is capable is determined based at least in part on whether the UE supports an inter-band carrier aggregation configuration;

receiving, at the UE, first control information from the base station, wherein the first control information includes instructions for configuring the UE with closed-loop transmit antenna selection on one of a plurality of component carriers based on a transmission antenna selection from the base station in response to the indication of the antenna switching capabilities; and receiving, at the UE, second control information wherein the second control information includes instructions for configuring the UE with open-loop transmit antenna selection on at least one other of the plurality of the component carriers based on the transmission antenna selection.

10. The method of claim 9, wherein the one of the plurality of component carriers includes a primary component carrier.

11. The method of claim 10, wherein the at least one other of the plurality of component carriers includes a secondary component carrier.

12. An apparatus configured for wireless communication, comprising:

means for sending, by a user equipment (UE), to a base station, an indication of antenna switching capabilities of the UE for a plurality of component carriers, wherein the indication of antenna switching capabilities of the UE indicates whether the UE is capable of switching at least one antenna utilized to transmit on one or more components carriers of the plurality of component carriers without being required to switch an antenna for remaining component carriers of the plurality of the component carriers, wherein whether the UE is capable is determined based at least in part on whether the UE supports an inter-band carrier aggregation configuration;

means for receiving, at the UE, first control information from the base station, wherein the first control information includes instructions for configuring the UE with closed-loop transmit antenna selection on one of a plurality of component carriers based on a transmission antenna selection from the base station in response to the indication of the antenna switching capabilities; and means for receiving, at the UE, second control information wherein the second control information includes instructions for configuring the UE with open-loop transmit antenna selection on at least one other of the plurality of the component carriers based on the transmission antenna selection.

13. The apparatus of claim 12, wherein the one of the plurality of component carriers includes a primary component carrier.

14. The apparatus of claim 13, wherein the at least one other of the plurality of component carriers includes a secondary component carrier.

15. A non-transitory computer-readable medium having program code recorded thereon comprising:

program code to send, by a user equipment (UE), to a base station, an indication of antenna switching capabilities of the UE for a plurality of component carriers, wherein the indication of antenna switching capabilities of the UE indicates whether the UE is capable of switching at least one antenna utilized to transmit on one or more components carriers of the plurality of component carriers without being required to switch an antenna for remaining component carriers of the plurality of the component carriers, wherein whether the UE is capable is determined based at least in part on whether the UE supports an inter-band carrier aggregation configuration;

program code to receive, at the UE, first control information from the base station, wherein the first control information includes instructions for configuring the UE with closed-loop transmit antenna selection on one of a plurality of component carriers based on a transmission antenna selection from the base station in response to the indication of the antenna switching capabilities; and program code to receive, at the UE, second control information wherein the second control information includes instructions for configuring the UE with open-loop transmit antenna selection on at least one other of the plurality of the component carriers based on the transmission antenna selection.

16. An apparatus configured for wireless communication, the apparatus comprising:

at least one processor; and a memory coupled to the at least one processor, wherein the at least one processor is configured to:

send, by a user equipment (UE), to a base station, an indication of antenna switching capabilities of the UE for a plurality of component carriers, wherein the indication of antenna switching capabilities of the UE indicates whether the UE is capable of switching at least one antenna utilized to transmit on one or more components carriers of the plurality of component carriers without being required to switch an antenna for remaining component carriers of the plurality of the component carriers, wherein whether the UE is capable is determined based at least in part on whether the UE supports an inter-band carrier aggregation configuration;

receive, at the UE, first control information from the base station, wherein the first control information includes instructions for configuring the UE with closed-loop transmit antenna selection on one of a plurality of component carriers based on a transmission antenna selection from the base station in response to the indication of the antenna switching capabilities; and receive, at the UE, second control information wherein the second control information includes instructions for configuring the UE with open-loop transmit antenna selection on at least one other of the plurality of the component carriers based on the transmission antenna selection.

\* \* \* \* \*